US008993709B2

(12) United States Patent
Hoffmockel et al.

(10) Patent No.: US 8,993,709 B2
(45) Date of Patent: Mar. 31, 2015

(54) PROCESS FOR PRODUCING OXYMETHYLENE POLYMERS

(75) Inventors: Michael Hoffmockel, Neidernhausen (DE); Michael Haubs, Bad Kreuznach (DE); Jeurgen Lingnau, Mainz (DE); Horst Roeschert, Ober-Hillsheim (DE)

(73) Assignee: Ticona GmbH, Sulzbach (DE)

(*) Notice: Subject to any disclaimer, the term of this patent is extended or adjusted under 35 U.S.C. 154(b) by 239 days.

(21) Appl. No.: 13/546,288

(22) Filed: Jul. 11, 2012

(65) Prior Publication Data

US 2013/0018170 A1 Jan. 17, 2013

Related U.S. Application Data

(60) Provisional application No. 61/514,701, filed on Aug. 3, 2011.

(30) Foreign Application Priority Data

Jul. 15, 2011 (EP) ..................................... 11174225

(51) Int. Cl.
*C08G 14/06* (2006.01)
*C08G 14/12* (2006.01)
*C08G 2/00* (2006.01)
*C08G 14/00* (2006.01)

(52) U.S. Cl.
CPC ...................................... *C08G 2/00* (2013.01)
USPC ........... 528/243; 528/232; 528/425; 528/482; 528/501; 528/502 R; 528/503

(58) Field of Classification Search
USPC .............. 528/243, 232, 425, 501, 502 R, 503
See application file for complete search history.

(56) References Cited

U.S. PATENT DOCUMENTS

| | | | |
|---|---|---|---|
| 5,248,762 A | 9/1993 | Yamamoto et al. |
| 5,344,911 A | 9/1994 | Yamamoto et al. |
| 5,506,332 A | 4/1996 | Funhoff et al. |
| 5,541,284 A | 7/1996 | Arnoldi et al. |
| 5,587,449 A | 12/1996 | Fleischer et al. |
| 5,688,897 A | 11/1997 | Tanimura et al. |
| 5,726,276 A | 3/1998 | Nakai et al. |
| 5,728,798 A | 3/1998 | Nakai et al. |
| 5,756,594 A | 5/1998 | Funhoff et al. |
| 5,811,511 A | 9/1998 | Tanigawa et al. |
| 5,837,781 A | 11/1998 | Tanimura et al. |
| 5,844,059 A | 12/1998 | Yamamoto et al. |
| 5,866,670 A | 2/1999 | Nakai et al. |
| 5,886,139 A | 3/1999 | Yamamoto et al. |
| 5,929,195 A | 7/1999 | Kawaguchi et al. |
| 5,942,595 A | 8/1999 | Adelman et al. |
| 5,948,841 A | 9/1999 | Nakamura |
| 6,037,439 A | 3/2000 | Serizawa et al. |
| 6,139,804 A | 10/2000 | Tanigawa et al. |
| 6,255,440 B1 | 7/2001 | Okawa et al. |
| 6,365,655 B1 | 4/2002 | Tanimura et al. |
| 6,388,049 B1 | 5/2002 | Yokoyama et al. |
| 6,399,699 B1 | 6/2002 | Tanigawa et al. |
| 6,426,393 B1 | 7/2002 | Tajima et al. |
| 6,433,128 B2 | 8/2002 | Nakamura et al. |
| 6,506,838 B1 | 1/2003 | Seyama |
| 6,506,850 B1 | 1/2003 | Tanimura et al. |
| 6,576,740 B1 | 6/2003 | Chin et al. |
| 6,617,416 B2 | 9/2003 | Nakamura et al. |
| 6,753,368 B2 | 6/2004 | Okawa et al. |
| 6,756,475 B2 | 6/2004 | Mours et al. |
| 6,777,487 B2 | 8/2004 | Niino et al. |
| 7,064,177 B2 | 6/2006 | Goertz et al. |
| 7,112,651 B2 | 9/2006 | Gortz et al. |
| 7,414,159 B2 | 8/2008 | Stoefer et al. |
| 7,476,718 B2 | 1/2009 | Blair |
| 7,598,339 B2 | 10/2009 | Schwittay et al. |
| 7,645,822 B2 | 1/2010 | Assmann et al. |
| 7,812,110 B2 | 10/2010 | Haubs et al. |
| 7,816,433 B2 | 10/2010 | Komatsu et al. |
| 7,863,393 B2 | 1/2011 | Assmann et al. |
| 7,897,672 B2 | 3/2011 | Nagai et al. |
| 7,906,609 B2 | 3/2011 | Blinzler et al. |
| 7,928,184 B2 | 4/2011 | Harashina et al. |
| 2005/0255990 A1 | 11/2005 | Luinstra |
| 2007/0179273 A1 | 8/2007 | Haubs et al. |
| 2008/0097077 A1 | 4/2008 | Assmann et al. |
| 2008/0214748 A1 | 9/2008 | Assmann et al. |
| 2008/0234459 A1 | 9/2008 | Lang et al. |
| 2008/0271381 A1 | 11/2008 | Harashina et al. |
| 2010/0004409 A1 | 1/2010 | Schwittay et al. |

FOREIGN PATENT DOCUMENTS

| | | |
|---|---|---|
| CN | 1105126 | 4/2003 |
| CN | 1105127 | 4/2003 |
| CN | 1105128 | 4/2003 |
| CN | 1120853 | 9/2003 |
| CN | 1131254 | 12/2003 |
| CN | 101472967 | 7/2009 |
| CN | 101525404 | 9/2009 |
| EP | 0504405 | 9/1992 |
| EP | 0629644 | 12/1994 |
| EP | 2050774 | 4/2009 |
| JP | 3230554 | 11/2001 |
| JP | 3847007 | 11/2006 |
| JP | 4270664 | 6/2009 |
| JP | 4387619 | 12/2009 |
| JP | 4458649 | 4/2010 |
| JP | 4624963 | 2/2011 |
| WO | WO97/24384 | 7/1997 |
| WO | WO03/046035 | 6/2003 |
| WO | WO2004/065444 | 1/2004 |
| WO | WO2005/033183 | 4/2005 |
| WO | WO2006/077055 | 1/2006 |
| WO | WO2006/082196 | 2/2006 |
| WO | WO2006/089915 | 2/2006 |
| WO | WO2006/120199 | 5/2006 |
| WO | WO2006/120218 | 5/2006 |
| WO | WO2006/134121 | 6/2006 |
| WO | WO2007/036476 | 4/2007 |
| WO | WO2009/027434 | 3/2009 |
| WO | WO2009/127386 | 10/2009 |

*Primary Examiner* — Duc Truong
(74) *Attorney, Agent, or Firm* — Dority & Manning, P.A.

(57) ABSTRACT

The present invention relates to a process for the preparation of oxymethylene polymers, the oxymethylene polymers obtained therefrom as well as their use.

23 Claims, No Drawings

PROCESS FOR PRODUCING OXYMETHYLENE POLYMERS

The present application claims filing benefit of U.S. Provisional Pat. App. Ser. No. 61/514,701 having a filing date of Aug. 3, 2011, and claims priority to European Patent Application Serial Number 11174225.0 having a filing date of Jul. 15, 2011, both of which are incorporated herein in their entirety.

The present invention relates to an improved process for the preparation of oxymethylene polymers, the oxymethylene polymers obtained therefrom as well as their use.

The preparation of polyoxymethylene polymers is known per se. The polymerization can take place either in bulk or else in solution as a precipitation polymerization, either at atmospheric pressure or at super atmospheric pressure. Chain transfer agents, such as methylal, are also known to be used for the preparation of oxymethylene polymers.

The cationic initiator variant of the polymerization uses cationic initiators. A disadvantage of the use of cationic initiators is that these also catalyze the reverse reaction, i.e. the degradation of POM to give formaldehyde. The reaction mixture therefore has to be deactivated after the polymerization.

A very wide variety of processes have previously been disclosed for deactivation of reaction mixtures. These can be divided into processes in which the polymer melt is treated with a basic deactivator and processes in which protic compounds, such as methanol, are used.

The polymerization and depolymerization of oxymethylene polymers are very rapid reactions. Deactivation of active constituents in the reaction mixture therefore has to take place rapidly and completely, in order to minimize degradation of the polymer produced. In the case of deactivation in the polymer melt, the viscosity restricts the speed of mixing to incorporate the deactivator. Although viscosity can be lowered via temperature increase, this also increases the rate of polymer degradation. In the case of deactivation with protic compounds, chain cleavage takes place at elevated temperatures, e.g. via a hydrogen transfer reaction.

Solutions of bases in non-protic liquids, e.g. in acetone, have been used for deactivation of the polymerization mixture during synthesis of oxymethylene homo- and co-polymers. In this case, either the polymerization mixture has been milled and then introduced into the solution of base in non-protic liquid or the grinding itself has taken place in the presence of the base/liquid solution mentioned. However, the base/liquid solution does not dissolve the oxymethylene polymer. Instead, a suspension is obtained of finely milled oxymethylene polymer in this solution. Here, again, the problem of insufficient or insufficiently rapid deactivation of the polymer arises.

Efficient removal of monomers, formed oligomers and formaldehyde from the hydrolysis step is a key element of oxymethylene polymer production. While the amount of residual monomers can be significantly reduced by an efficient polymerization and quench process, as taught in U.S. Pat. No. 7,812,110 and WO-A1-2009/127386, the melt hydrolysis described therein has limitations in the efficiency of the removal of oligomers, remaining residual monomers and the formaldehyde from instable end groups. This is especially pronounced as the comonomer content of such polymers is reduced.

The concept of increasing temperature with proceeding polymerization combined with aprotic quench followed by deactivation prior to reaching a homogeneous state like disclosed in WO-A1-2009/127386 and U.S. Pat. No. 7,812,110 yields polymers feasible for most commercial applications. However, for applications in the medical field, for drinking water and food applications, reduced levels of residual monomers, formaldehyde and oligomers are required. Therefore, there is a demand for oxymethylene polymers which demonstrate a reduced level of formaldehyde, oligomers and monomers.

It is an object of the present invention to provide a simple process for the preparation of oxymethylene polymers (also called "POM" hereinafter) of high stability, where the process can be carried out using simple means and at low energy costs, and also permits the synthesis of oxymethylene homo- and copolymers with low monomer, comonomer, oligomer and formaldehyde levels.

It has surprisingly been found that the above-mentioned problems can be solved by feeding the obtained polymer in residual monomer as a homogeneous melt directly into a hot hydrolysis mixture comprising protic solvents and subsequently precipitating the polymer.

A first embodiment of the present invention is a process for the preparation of oxymethylene polymers comprising the following steps:
 a. heterogeneous polymerization, in the presence of a chain transfer agent and an initiator for cationic polymerization, of a mixture comprising
  i. a-1) at least one monomer that forms —$CH_2$—O— units, and
  ii. a-2) optionally, at least one comonomer copolymerizable therewith and having at least one C—C bond,
 b. raising the temperature during the course of the polymerization sufficiently far that a substantially homogeneous polymer melt is present at the end of polymerization prior to deactivation alongside remaining residual monomers,
 c. deactivating the active polymer chains in a substantially homogeneous phase by feeding a deactivator into the polymer and monomer mixture,
 d. feeding the deactivated homogeneous polymer mixture prepared in step a) to c) to a hydrolysis zone as a hydrolysis mixture comprising one or more protic solvent(s) and wherein said polymer mixture is subjected to hydrolysis in the presence of protic solvent at a temperature which is higher than the melting point of the polymer mixture prepared in step a) to c); and
 e. precipitating the hydrolyzed oxymethylene polymer from the solution prepared in step d).

Step a) of the process of the invention is the known polymerization of monomers that form —CH—O— units, if appropriate in the presence of one or more comonomers copolymerizable therewith and having at least one C—C bond, e.g. cyclic acetals, such as 1,3-dioxolane. The polymerization is a heterogeneous polymerization which means that the polymerization takes the form of a precipitation polymerization, and solid polymer is therefore present alongside monomer which has not yet been consumed. For this, a monomer that forms —$CH_2$—O— units, or a mixture of different monomers and comonomers is reacted using conventional initiators for cationic polymerization and using chain transfer agents, such as acetals or formaldehyde, as regulator, in a manner known per se. The heterogeneous polymerization in step a) is typically carried out at a temperature ranging from 60° C. to 150° C., preferably, 80° C. to 140° C. The heterogeneous polymerization is preferably carried out at a pressure ranging from 15 to 100 bar, more preferably 25 to 50 bar.

The initial polymerization temperature in step a) is sufficiently low that the polymer substantially precipitates in the reaction mixture, i.e. the reaction mixture begins forming a heterogeneous solid/liquid mixture. The solid phase here is formed by precipitated polymer, while the liquid phase is in essence composed of as yet unconverted monomer. Preferably, the polymerization conversion is from 10% to 70%, and a conveyable mixture is therefore present.

In step b) of the process according to the present invention, following step a), the polymerization temperature rises in such a way that the heterogeneous solid/liquid mixture becomes substantially homogeneous. The temperature rise is brought about on the one hand via the heat of polymerization/crystallization, and on the other hand via heat supply from outside as needed to complete the transition from solid to melt. This enables the polymerization to be carried out with a certain temperature profile. A controlled temperature profile permits adjustment as desired of some of the properties of the polymers, examples being impact resistance or modulus of elasticity, within certain limits. The controlled utilization of the heat of polymerization/crystallization permits efficient utilization of energy in this step of the process. On the other hand, it is also possible to achieve other temperature profiles for the purposes of the process via appropriate heating elements and cooling elements.

The temperature profile over the entire polymerization typically varies from 65° C. initially to 250° C. prior to deactivation, but can also run from 100° C. initially to 200° C. prior to deactivation. Preferably, the temperature and residence time in step b) of the process of the present invention are minimized, in order to suppress undesired side-reactions. Typically, in step b) of the process of the present invention, the temperature is raised to a range of from 150° C. to 250° C., preferably 160° C. to 200° C. The temperature is to be adjusted according to the invention in such a way that the reaction mixture is substantially homogeneous, i.e. the polymer is molten.

In step c) of the process of the present invention, the active polymer chains in the homogeneous phase obtained from step b) are deactivated by feeding a deactivator into the polymer and monomer mixture. The substantially homogeneous, liquid reaction mixture which can comprise, if appropriate, small amounts of solid constituents and which still comprises unconverted monomers, such as trioxane and formaldehyde, alongside polymer, is brought into contact with deactivators. These can be in bulk form or in a form diluted with an inert aprotic solvent when they are admixed with the polymerization mixture. The result is rapid and complete deactivation of the active chain ends. It has been found that the polymerization can be terminated even when the liquid polymerization mixture at the end of the polymerization is substantially—but not necessarily completely—molten. It is therefore possible to terminate the polymerization via addition of deactivators when the polymerization mixture still comprises from about 5 to 10% by weight of solid constituents.

For the preparation of oxymethylene polymers, a monomer that forms —$CH_2$—O— units or a mixture of different monomers, is reacted in the manner described above. Examples of monomers that form —$CH_2$—O— units are formaldehyde or its cyclic oligomers, such as 1,3,5-trioxane(trioxane) or 1,3,5,7-tetraoxocane.

The oxymethylene polymers are generally unbranched linear polymers which generally contain at least 80 mol %, preferably at least 90 mol %, in particular at least 95 mol %, of oxymethylene units (—$CH_2$—O—). Alongside these, the oxymethylene polymers contain —$(CH_2)_x$—O— units, where x can assume the values from 2 to 25. Small amounts of branching agents can be used if desired. Examples of branching agents used are alcohols whose functionality is three or higher, or their derivatives, preferably tri- to hexahydric alcohols or their derivatives. Preferred derivatives are formulas in which, respectively, two OH groups have been reacted with formaldehyde, and also epoxides. The amount of branching agents is usually not more than 1% by weight, based on the total amount of monomer used for the preparation of the oxymethylene polymers, preferably not more than 0.3% by weight.

The invention also encompasses the preparation of those oxymethylene polymers which can also contain hydroxyalkylene end groups —O—$(CH_2)_x$—OH, alongside methoxy end groups, where x can assume the values from 2 to 25. These polymers can be prepared by carrying out the polymerization in the presence of diols of the general formula HO—$(CH_2)_x$—OH, where x can assume the values from 2 to 25. The polymerization in the presence of the diols leads, via chain transfer, to polymers having hydroxyalkylene end groups. The concentration of the diols in the reaction mixture depends on the percentage of the end groups intended to be present in the form of —O—$(CH_2)_x$—OH, and is from 10 ppm by weight to 2 percent by weight.

The molecular weights of these polymers, expressed via the volume melt index MVR, can be adjusted within a wide range. The polymers typically have repeat structural units of the formula —$(CH$—$O$—$)_n$—, where n indicates the average degree of polymerization (number average) and preferably varies in the range from 100 to 10,000, in particular from 500 to 4,000.

The inventively prepared oxymethylene polymers derive from formaldehyde or from its cyclic oligomers, such as trioxane or tetraoxocane.

It is preferable to prepare oxymethylene polymers in which at least 80%, preferably at least 90%, very particularly preferably at least 95%, of all of the end groups are alkyl ether groups, in particular methoxy or ethoxy groups. Oxymethylene polymers very particularly preferably prepared derive from trioxane.

Monomers that form —$CH_2$—O— units and whose use is particularly preferred are formaldehyde or, very particularly preferably, trioxane.

The molecular weight of the resultant homo- and copolymers can be adjusted via use of acetals of formaldehyde (chain transfer agents). These also lead to production of etherified end groups of the polymers, and a separate reaction with capping reagents can therefore be omitted.

Chain transfer agents used are monomeric or oligomeric acetals of formaldehyde. Preferred chain transfer agents are compounds of the formula

$$R^1\text{—}(O\text{—}CH_2)_q\text{—}O\text{—}R^2 \qquad (I)$$

in which $R^1$ and $R^2$, independently of one another, are monovalent organic radicals, preferably alkyl radicals, such as butyl, propyl, ethyl, and in particular methyl, and q is a whole number from 1 to 50.

Particularly preferred chain transfer agents are compounds of the formula I, in which q=1, very particularly preferably methylal.

The amounts used of the chain transfer agents are usually up to 5000 ppm, preferably from 100 to 3000 ppm, based on the monomer (mixture).

The initiators used can comprise the cationic initiators usually used in the preparation of oxymethylene homo- and copolymers. Examples of these are protic acids, e.g. fluorinated or chlorinated alkyl- and arylsulfonic acids, such as trifluoromethanesulfonic acid, trifluoromethanesulfonic anhydride, or Lewis acids, such as stannic tetrachloride, arsenic pentafluoride, phosphorus pentafluoride, and boron trifluoride, and also their complex compounds, e.g. boron trifluoride etherate, and carbocation sources, such as triphenylmethyl hexafluorophosphate.

Further, according to a preferred embodiment of the present invention, the initiator for cationic polymerization is a heteropolyacid or an acid salt thereof which is more preferably dissolved in an alkyl ester of a polybasic carboxylic acid.

The initiator for cationic polymerization is a heteropolyacid or an acid salt thereof. The heteropolyacid is a generic term for polyacids formed by the condensation of different kinds of oxo acids through dehydration and contains a mono- or poly-nuclear complex ion wherein a hetero element is present in the center and the oxo acid residues are condensed through oxygen atoms. Such a heteropolyacid is represented by formula (II):

$$H_x[M_mM'_nO_z] \cdot yH_2O \quad (II)$$

wherein
M represents an element selected from the group consisting of P, Si, Ge, Sn, As, Sb, U, Mn, Re, Cu, Ni, Ti, Co, Fe, Cr, Th and Ce,
M' represents an element selected from the group consisting of W, Mo, V and Nb,
m is 1 to 10,
n is 6 to 40,
z is 10 to 100,
x is an integer of 1 or above, and
y is 0 to 50.

According to a preferred embodiment of the method according to the present invention the heteropolyacid is a compound represented by the following formula:

$$H_x[M_mM'_nO_z] \cdot yH_2O$$

wherein
M represents an element selected from the group consisting of P and Si;
M' represents a coordinating element selected from the group consisting of W, Mo and V;
z is 10 to 100;
m is 1 to 10;
n is 6 to 40;
x is an integer of at least 1; and
y is 0 to 50.

In the heteropolyacid which is particularly effective as the initiator for cationic polymerization the central element (M) in the formula described above is composed of one or more kinds of elements selected from P and Si and the coordinate element (M') is composed of at least one element selected from W, Mo and V, particularly preferably W or Mo.

Further, acidic salts of heteropolyacids each having a form, in which any of the various metals substitutes for a part of H's (hydrogen atoms) in the formula (II) can also be used as the initiator in the method of the present invention.

Specific examples of heteropolyacids are selected from the group consisting of phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid and acid salts thereof.

Excellent results have been achieved with heteropolyacids selected from 12-molybdophosphoric acid ($H_3PMo_{12}O_{40}$) and 12-tungstophosphoric acid ($H_3PW_{12}O_{40}$) and mixtures thereof.

The amount of the heteropolyacid or the acid salt thereof to be used as an initiator for the polymerization of a monomer component, which forms —CH—O— units is 0.1 to 1000 ppm, preferably 0.2 to 40 ppm, more preferably 0.3 to 5 ppm based on the total amount of the monomer component.

According to an especially preferred embodiment of the present invention, the initiator for cationic polymerization comprises at least one protic acid and at least one salt of a protic acid, wherein said at least one protic acid is sulfuric acid, tetrafluoroboric acid, perchloric acid, fluorinated alkyl sulfonic acid, chlorinated alkyl sulfonic acid or aryl sulfonic acid, and wherein said salt of protic acid is an alkali metal or alkaline earth metal salt of protic acid and/or a substituted ammonium salt of protic acid, the cations of the ammonium salt having the general formula (III)

$$R^1-\underset{\underset{R^4}{|}}{\overset{\overset{R^3}{|}}{N^+}}-R^2 \quad (III)$$

where $R^1$-$R^4$ are independently hydrogen, an alkyl group or an aryl group.

Particular preference is given to substituted ammonium ions having the general formula (III)

$$R^1-\underset{\underset{R^4}{|}}{\overset{\overset{R^3}{|}}{N^+}}-R^2 \quad (III)$$

where $R^1$ to R4 are independently hydrogen, an alkyl group such as methyl, ethyl, n-propyl, isopropyl, n-butyl, isobutyl or an aryl group such as phenyl or 4-methoxyphenyl.

Substituted ammonium ions are also preferred because the corresponding salts are very simple to prepare by mixing the protic acid with the corresponding amine. Thus, mixing triethylamine and trifluoromethanesulfonic acid forms triethylammonium triflate.

Useful organic cations further include protonated nitrogenous compounds, examples being protonated imidazole and protonated amides. Useful amides include for example dimethylformamide, dimethylacetamide and N-methylpyrrolidone.

The anions of the salts are chosen for low nucleophilicity and good thermal stability. Examples are perchlorate, tetrafluoroborate, tetraphenylborate, hexafluorophosphate and the preferred trifluoromethanesulfonate.

According to the present invention, the molar ratio of protic acid to salt can be varied within a wide window. In principle, molar ratios of protic acid to salt in the range from 1:0.01 to 1:2000 are possible, preferably in the range from 1:0.5 to 1:10, more preferably in the range from 1:0.8 to 1:8 and most preferably in the range from 1:1 to 1:4.

The amount of initiator used according to the present invention is in the range from $10^{-6}$% by weight to 1% by weight, preferably in the range from $10^{-5}$% by weight to $10^{-3}$% by weight and more preferably in the range from $2\times10^{-5}$% by weight to $5\times10^{-4}$% by weight, based on the total weight of monomers used. The amount of initiator used depends on the chemical composition of the protic acid and the chemical composition of the monomers or monomer mixture. For example, typically less initiator is used for homopolymerizing 1,3,5-trioxane than for copolymerizing trioxane with dioxolane.

The initiator of the present invention is particularly preferable for the homo- or copolymerization of 1,3,5-trioxane (trioxane). But in principle tetraoxocane can also be used as monomer. Useful comonomers include the monomers known to be copolymerizable with trioxane, their fraction in the monomer mixture ranging from 0.1% to 25% by weight and preferably from 0.5% to 10% by weight, all based on the weight of the total mixture.

Known suitable comonomers include cyclic ethers and particularly cyclic acetals having at least 2 adjacent carbon atoms and 3 to 9 ring members. Examples thereof are ethylene oxide, propylene oxide, trimethylene oxide, tetrahydrofuran, butadiene oxide, 1,3-dioxolane, 1,4-butanediol formal, diethylene glycol formal, o-xylene glycol formal, thiodiglycol formal or 1,3-oxthiolane or mixtures thereof.

Further copolymerizable comonomers are olefinically unsaturated compounds such as styrene, isobutylene, or linear polyacetals such as polydioxolane.

In order to terminate the polymerization, the homogeneous, liquid reaction mixture, which still comprises unconverted monomers, such as trioxane and formaldehyde, alongside polymer, is brought into contact with deactivators. These can be added in bulk form or a form diluted with an inert aprotic solvent to the polymerization mixture. The result is rapid and complete deactivation of the active chain ends.

Deactivators that can be used are those compounds which react with the active chain ends in such a way as to terminate the polymerization reaction. Examples are the organic bases triethylamine or melamine, and also the inorganic bases potassium carbonate or sodium acetate. It is also possible to use very weak organic bases, such as carboxamides, e.g. dimethylformamide. Tertiary bases are particularly preferred, examples being triethylamine and hexamethylmelamine.

The concentrations used of the bases are preferably from 1 ppm to 1% by weight, based on the polymerization material. Concentrations of from 10 ppm to 5000 ppm are preferred.

Typically, the temperature in step c) of the process of the invention ranges from 150° C. to 250° C., preferably 160° C. to 200° C. Further, typically the pressure during the deactivation varies in the range from 3 to 100 bar, preferably 15 to 100 bar, more preferably from 25 to 50 bar. The polymer mixture at the temperature and physical state attained in step b) is conveyed directly to a deactivation zone, with contact by the deactivator in the same state without further heating, or with sufficient heat to maintain such state for a time sufficient to provide intimate mixing with deactivator. Due to the almost homogeneous mixture the deactivation is almost instantaneously completed.

The polymerization can take place in the reactors known for the preparation of POM homo- and copolymers. Typically, kneaders or extruders are used, designed to be temperature-controllable and pressure-resistant.

The phases a) and b) are particularly preferably carried out in an assembly where a continuous transition is present between the polymerization in a heterogeneous phase and the polymerization in a substantially homogeneous phase. However, the two steps of the process can also be undertaken in different assemblies.

The deactivation of the polymerization mixture can be undertaken in a kneader or extruder, or else in a tubular reactor using static mixers.

The polymerization time can vary within a wide range and typically varies in the range from 10 seconds to 10 minutes, preferably from 15 seconds to 5 minutes, and particularly preferably from 20 to 100 seconds.

The deactivation proceeds very rapidly and is practically completed with the mixing of the components. After the deactivation of the active chain ends, there is then no further need for capping of end groups to obtain heat-resistant polymers.

In step d) of the process of the present invention a substantially homogeneous solution is prepared by feeding the polymer mixture prepared in step a) to c) to a hydrolysis zone containing a mixture comprising one or more protic solvent(s). The polymer mixture is subjected to hydrolysis in the presence of protic solvent(s) at a temperature which is higher than the melting point of the polymer mixture prepared in steps a) to c) (as it is introduced to the hydrolysis zone).

Hydrolysis within the meaning of the present invention is the removal of unstable end groups, e.g. formiate end groups and hemiacetal groups. Thus, hydrolysis can lead to an unzipping of formaldehyde units from the chain end up to the first hydrolysis stable group.

According to a preferred embodiment, the hydrolysis zone contains a mixture comprising one or more solvents selected from the group consisting of water, methanol, ethanol and isopropanol. According to an especially preferred embodiment of the present invention, the hydrolysis zone contains a hydrolysis mixture comprising water and methanol, preferably in a weight ratio of water:methanol ranging from 1:3 to 1:20, more preferably 1:5 to 1:15. Typically, the temperature of the hydrolysis mixture ranges from 160° C. to 220° C., preferably 170° C. to 200° C. prior to feeding the polymer mixture prepared in steps a) to c) to the hydrolysis zone. The hydrolysis of the polymer mixture is typically carried out at a temperature ranging from 160° C. to 220° C., preferably 170° C. to 200° C.

Excellent results can be obtained with a hydrolysis mixture which comprises protic solvents and additionally a basic catalyst for the hydrolysis of the unstable end groups. Especially preferred basic catalysts are tertiary amines, in particular triethylamine. Preferably, the basic catalyst for the hydrolysis of the unstable end groups is present in the hydrolysis mixture in an amount ranging from 1 ppm to 1 weight %, more preferably from 10 ppm to 5000 ppm, even more preferably from 50 ppm to 1000 ppm, based on the total amount of protic solvents in the hydrolysis mixture.

The hydrolysis in step d) of the process of the present invention is typically carried out under pressure, preferably ranging from 2 to 100 bar, more preferably 5 to 80 bar, especially 20 to 60 bar.

Step e) of the process of the present invention comprises precipitating of the hydrolyzed oxymethylene polymer from the solution prepared in step d). The precipitation in step e) is typically conducted by feeding the solution prepared in step d) into a precipitating solution or by decreasing the temperature of the solution.

According to an especially preferred embodiment of the present invention the process of the present invention comprises the following steps a) heterogeneous polymerization, in the presence of a chain transfer agent and an initiator for cationic polymerization, of a mixture comprising
    a-1) trioxane, and
    a-2) optionally at least one comonomer copolymerizable therewith and having at least one C—C bond,
  b) raising the temperature during the course of the polymerization sufficiently far that a substantially homogeneous polymer melt is present at the end of polymerization prior to deactivation alongside remaining residual monomers,
  c) deactivating the active polymer chains in a substantially homogeneous phase by feeding triethyl amine into the polymer and monomer mixture, d) feeding the deactivated homogeneous polymer mixture prepared in step a) to c) to a hydrolysis zone as a mixture comprising methanol and water and wherein said polymer mixture is subjected to hydrolysis in the presence of a hydrolysis mixture comprising methanol and water at a temperature which is higher than the melting point of the polymer mixture prepared in step a) to c); and e) precipitating the hydrolyzed oxymethylene polymer from the solution prepared in step d) by decreasing the temperature of the solution.

A further embodiment of the present invention is an oxymethylene polymer obtained by the process of the invention.

The oxymethylene polymers obtained by the process of the invention have a particular advantage compared to the polyoxymethylene polymers known in the prior art due to their low content of oligomers, formaldehyde monomers and comonomers. This makes these polyoxymethylene polymers suitable for use as a raw material for applications in the field of drinking water, food and medical devices.

According to a preferred embodiment the oxymethylene polymers of the invention are used for devices or parts of devices selected from the group consisting of water meter, water tubes, fittings, aerator, insulin pen and dry powder inhaler.

The oxymethylene polymers can further be modified by the addition of stabilizer and processing aids (hereinafter also termed "additives") which can be incorporated into the polyoxymethylene polymer by use of an extruder.

Components that can be used in the mixture of additives are the compounds usually used for the stabilization and/or modification of oxymethylene polymers.

Examples of these are antioxidants, acid scavengers, formaldehyde scavengers, UV stabilizers, or heat stabilizers. The mixture of additives can comprise, alongside these, processing aids, such as adhesion promoters, lubricants, nucleating agents, mold-release agents, fillers, reinforcing materials, or antistatic agents, and also additives which give the molding composition a desired property, examples being dyes and/or pigments, and/or impact modifiers, and/or additives conferring electrical conductivity, and also mixtures of the said additives, but without any restriction of scope to the examples mentioned.

EXAMPLES

The polymerization was carried out in a gastight, pressure-resistant twin-screw extruder with 7 separately adjustable heating stages of approximately equal length. The starting compounds were metered in by means of HPLC pumps and mixed efficiently in a premixing zone by static mixing elements, before they passed onwards for polymerization in the extruder. Triethyl amine as deactivator was fed at the sixth zone to quench the reaction.

4 kg/h of trioxane containing 3.5% of dioxolane and 1500 ppm of methylal was mixed with the initiator solution containing trifluoro methane sulfonic acid and the salt of triethyl amine and trifluoro methane sulfonic acid in the weight ratio of 1:2. The concentration of the free trifluoro methane sulfonic acid was 1 ppm based on the monomer feed.

The temperature profile in the polymerization extruder is listed in the following table:

| Zone 1 | Zone 2 | Zone 3 | Zone 4 | Zone 5 | Zone 6 | Zone 7 |
|--------|--------|--------|--------|--------|--------|--------|
| 100° C. | 110° C. | 125° C. | 140° C. | 150° C. | 170° C. | 170° C. |

The reaction was carried out at 30 bars. The pressure was kept by means of a control valve at the discharge of the reactor.

COMPARATIVE EXAMPLES 1500 ppm of triethyl amine was fed as deactivator. The hydrolysis (removal of unstable hemiacetal end-groups and formate end-groups) was carried out in a tube reactor equipped with static mixing elements at 180° C. and 20 min residence time. The pressure control valve was located at the discharge of the tube reactor. The degassing of unconverted monomers and formaldehyde was done in a degassing extruder. The polymer obtained at the discharge of the degassing extruder was characterized for oligomer content.

EXAMPLES ACCORDING TO INVENTION 200 ppm of triethyl amine was fed as deactivator. The pressure control valve was located at the discharge of the polymerization reactor. Samples of the product were collected directly at the discharge. Hydrolysis was carried out in batch. 100 g of sample was dissolved in 1 kg of a mixture of 90% methanol and 10% water containing 200 ppm of triethyl amine at 180° C. for 20 min in an autoclave.

Subsequently the polymer was precipitated by cooling the mixture. The polymer obtained was filtered, dried and characterized for oligomer content.

The oligomer content was determined by dissolving the polymer samples in said methanol water triethyl amine solution for 1 hour at 170° C. in an autoclave. After cooling and precipitation the formaldehyde in the solution was determined by two methods:

Photometry: reaction with acetyl acetone to lutidine (formaldehyde only)

Photometry: reaction with chronotropic acid (formaldehyde and homologues)

The difference between the results corrected by the trioxane content determined by GC is called the oligomer content.

The oligomer content of the products is listed in the following table:

| Comparative Examples | 0.81% Oligomers |
|---|---|
| | 0.72% Oligomers |
| | 0.85% Oligomers |
| Examples according to invention | 0.22% Oligomers |
| | 0.25% Oligomers |
| | 0.18% Oligomers |

The invention claimed is:

1. A process for the preparation of oxymethylene polymers comprising the following steps:

a) heterogeneous polymerization, in the presence of a chain transfer agent and an initiator for cationic polymerization, of a mixture comprising a-1) at least one monomer that forms —$CH_2$—O— units, and a-2) optionally at least one comonomer copolymerizable therewith and having at least one C—C bond, b) raising the temperature during the course of the polymerization sufficiently far that a substantially homogeneous polymer melt is present at the end of polymerization prior to deactivation alongside remaining residual monomers, c) deactivating the active polymer chains in a substantially homogeneous phase by feeding a deactivator into the polymer and monomer mixture, d) feeding the deactivated homogeneous polymer mixture prepared in step a) to c) to a hydrolysis zone as a hydrolysis mixture comprising one or more protic solvent(s) and wherein said polymer mixture is subjected to hydrolysis in the presence of protic solvent at a temperature which is higher than the melting point of the polymer mixture prepared in step a) to c); and e) precipitating the hydrolyzed oxymethylene polymer from the solution prepared in step d).

2. The process according to claim 1, wherein the chain transfer agent is an acetal of formaldehyde.

3. The process according to claim 2, wherein the chain transfer agent is a compound of the following formula (I):

in which
$R^1$ and $R^2$ represent independently of each other alkyl groups, and q is an integer from 1 to 100.

4. The process according to claim 3, wherein $R^1$ and/or $R^2$ is methyl.

5. The process according to claim 3, wherein q is 1.

6. The process according to claim 1 wherein the initiator for cationic polymerization comprises at least one protic acid and at least one salt of a protic acid, wherein said at least one protic acid is sulfuric acid, tetrafluoroboric acid, perchloric acid, fluorinated alkyl sulfonic acid, chlorinated alkyl sulfonic acid or aryl sulfonic acid, and wherein said salt of protic acid is an alkali metal or alkaline earth metal salt of protic acid and/or a substituted ammonium salt of protic acid, the cations of the ammonium salt having the general formula (III)

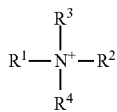

wherein $R^1$-$R^4$ are independently hydrogen, an alkyl group or an aryl group.

7. The process according to claim 6 wherein the molar ratio of protic acid to salt is in the range from 1:0.01 to 1:2000.

8. The process according to claim 6, wherein the molar ratio of protic acid to salt is in the range from 1:0.5 to 1:10.

9. The process according to claim 6, wherein the molar ratio of protic acid to salt is in the range from 1:1 to 1:4.

10. The process according to claim 1, wherein the initiator comprises a mixture of trifluoromethane sulfonic acid and the salt of triethylamine and trifluoromethane sulfonic acid.

11. The process according to claim 1, wherein the heterogeneous polymerization in step a) is carried out at a temperature ranging from 60° C. to 150° C.

12. The process according to claim 1, wherein the heterogeneous polymerization in step a) is carried out at a temperature ranging from 80° C. to 140° C.

13. The process according to claim 1, wherein in step b) the temperature is raised to a range of from 150° C. to 250° C.

14. The process according to claim 1, wherein in step b) the temperature is raised to a range of from 160° C. to 200° C.

15. The process according to claim 1, wherein the deactivator added to the homogeneous phase in step c) is a tertiary amine.

16. The process according to claim 15, wherein the tertiary amine is triethylamine.

17. The process according to claim 1, wherein the temperature of the hydrolysis mixture is from 160° C. to 220° C.

18. The process according to claim 1, wherein the temperature of the hydrolysis is from 170° C. to 200° C.

19. The process according to claim 1, wherein the hydrolysis mixture comprises one or more solvents selected from the group consisting of water, methanol, ethanol and isopropanol.

20. The process according to claim 1, wherein the hydrolysis mixture comprises water and methanol.

21. The process according to claim 20, wherein the water and methanol are in a weight ratio of from 1:3 to 1:20.

22. The process according to claim 20, wherein the water and methanol are in a weight ratio of from 1:5 to 1:15.

23. The process according to claim 1, wherein step e) is conducted by feeding the solution prepared in step d) into a precipitating solution or by decreasing the temperature of the solution.

* * * * *